United States Patent
Lee et al.

(10) Patent No.: US 8,451,766 B2
(45) Date of Patent: May 28, 2013

(54) METHOD FOR MEASURING NODE LOCATION USING MAC LAYER OF WIRELESS PERSONAL AREA NETWORK

(75) Inventors: Cheolhyo Lee, Daejon (KR); Jaeyoung Kim, Daejon (KR); Hongsoon Nam, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 159 days.

(21) Appl. No.: 12/681,470

(22) PCT Filed: Sep. 24, 2008

(86) PCT No.: PCT/KR2008/005664
§ 371 (c)(1),
(2), (4) Date: Jul. 8, 2010

(87) PCT Pub. No.: WO2009/045018
PCT Pub. Date: Apr. 9, 2009

(65) Prior Publication Data
US 2010/0278060 A1    Nov. 4, 2010

(30) Foreign Application Priority Data

Oct. 4, 2007   (KR) .................. 10-2007-0099983
May 26, 2008   (KR) .................. 10-2008-0048836

(51) Int. Cl.
*H04H 20/71* (2008.01)
(52) U.S. Cl.
USPC .................. 370/312; 370/252; 455/456.1
(58) Field of Classification Search
USPC ....... 370/252, 312, 315, 328, 338; 455/404.2, 455/440, 456.1–456.6
See application file for complete search history.

(56) References Cited

U.S. PATENT DOCUMENTS

| | | | |
|---|---|---|---|
| 2004/0233858 A1 | 11/2004 | Karaoguz | |
| 2004/0246986 A1* | 12/2004 | Belcea | 370/444 |
| 2006/0015503 A1 | 1/2006 | Simons et al. | |
| 2009/0147721 A1* | 6/2009 | Shim et al. | 370/312 |
| 2009/0170527 A1* | 7/2009 | Liu | 455/456.1 |

FOREIGN PATENT DOCUMENTS

| | | |
|---|---|---|
| KR | 10-2006-0009795 | 2/2006 |
| KR | 10-2006-0122137 | 11/2006 |
| KR | 10-2007-0074400 | 7/2007 |

OTHER PUBLICATIONS

International Search Report and Written Opinion issued Feb. 24, 2009 in corresponding International Application No. PCT/KR2008/005664.
Guerino Giancola, et al., "UWB MAC and Network Solutions for Low Data Rate with Location and Tracking Application," IEEE International Conference on Ultra-Wideband, Sep. 2005, pp. 758-763.
"Ranging and Location Information Transmission Framework for Low-Rate Wireless Personal Area Networks (LR-WPANs)", Telecommunications Technology Association, TTAS.KO-06.0155, Dec. 2007.

* cited by examiner

*Primary Examiner* — Kan Yuen
(74) *Attorney, Agent, or Firm* — Staas & Halsey LLP (57) ABSTRACT

Provided is a method for measuring a node location using a Media Access Control (MAC) layer of a Wireless Personal Area Network (WPAN). The method, includes: requesting ranging measurement to the mobile node by broadcasting an MAC frame where ranging measurement start is displayed according to a ranging measurement request message for a mobile node transmitted from outside; and receiving ranging measurement information measured in the mobile node as a response to the broadcasted MAC frame and broadcasting an MAC frame where ranging measurement end is displayed.

10 Claims, 4 Drawing Sheets

METHOD FOR MEASURING NODE LOCATION USING MAC LAYER OF WIRELESS PERSONAL AREA NETWORK

CROSS REFERENCE TO RELATED APPLICATIONS

This application is a continuation of and claims the benefit of International Application No. PCT/KR2008/005664, filed Sep. 24, 2008, and claims the benefit of Korean Application No. 10-2008-0048836, filed May 26, 2008, and Korean Application No. 10-2007-0099983, filed Oct. 4, 2007, the disclosures of all of which are incorporated herein by reference.

TECHNICAL FIELD

The present invention relates to a method for measuring a node location using a Media Access Control (MAC) layer of a Wireless Personal Area Network (WPAN); and, more particularly, to a method for measuring a node location using an MAC layer which can easily measure a mobile node location while maintaining compatibility with a typical MAC layer by measuring the mobile node location using an MAC frame newly defined to be capable of measuring a mobile node location through the MAC layer in a WPAN.

This work was supported by the IT R&D program for MIC/IITA [2006-S-070-02, "Development of Cognitive Wireless Home Networking System"].

BACKGROUND ART

As a wireless communication method is applied to diverse services, a location recognition service for detecting a location of a wireless device in addition to a data communication service is increasingly required. In order to satisfy the requirement for the location recognition service, diverse location recognition technologies and systems are suggested. The diverse location recognition technologies and systems will be described according to a transmitted/received signal creating method or a signal source applying method as follows.

When the location recognition technologies are divided according to the transmitted/received signal creating method, there are location recognition technologies using an infrared signal, a Radio Frequency (RF) signal, an ultrasonic signal, and an Ultra Wide Band (UWB) signal. Distance measuring precision of the location recognition technologies are differed according to each signal characteristic. For example, a distance error of several meters occurs in the location recognition technology using only the strength of the RF signal. On the other hand, the location recognition technology using the ultrasonic signal is precise to several centimeters.

As another dividing method, when the location recognition technologies are divided according to whether the same signal source is used in a data communication and ranging measurement procedure, the location recognition technologies are divided into location recognition technology differently using a transmitter/receiver for data communication and a transmitter/receiver for distance measurement, and location recognition technology performing data communication and distance measurement. As an example of the former technology where data communication is divided from distance measurement, a "Cricket" system uses an RF transmitter/receiver for data communication and uses an ultrasonic transmitter/receiver for distance measurement in parallel. On the other hand, as an example of the latter technology, a UWB system using one signal source can perform data communication and distance measurement using one transmitter/receiver.

Meanwhile, a Media Access Control (MAC) layer in a Wireless Personal Area Network (WPAN) used in data communication performs a function of forming a Personal Area Network (PAN) including a coordinator node and neighboring nodes. The MAC layer transmits data between the coordinator node and the neighboring nodes in the PAN.

In the communication technology on the MAC layer, diverse frames information, a channel scan method, a method for registering diverse channel scan devices, a channel access method, and a direct and indirect data transmitting method are defined. In the WPAN technology, functions of a physical layer and an MAC layer for simultaneously performing data communication and distance measurement are suggested.

Meanwhile, a distance between a specific node and reference nodes in a conventional WPAN can be measured based on information such as an angle difference and a time difference. The conventional ranging measurement technology using the time difference may adopt a two-way ranging (TWR) method for measuring a round trip time of data frame transmission between two devices without synchronizing a time through a cable as a technology of grasping a distance by measuring a transmission time of data or a packet.

A 2 dimensional (2D) coordinates value of the mobile node is acquired based on ranging measurement information among more than 3 reference nodes and mobile nodes on the basis of the physical layer and the MAC layer in the ranging measurement technology using the time difference. The ranging measurement information is transmitted to a positioning system capable of operating algorithm such as triangulation. The positioning system operates a final location coordinates value of the mobile node based on the transmitted ranging measurement information.

In the WPAN network layer, a mobile node location measuring procedure using a physical layer and an MAC layer is defined. The network layer operates according to a WPAN reference within a piconet and transmits the ranging measurement information to the positioning system via a plurality of piconets through data routing. The technology of measuring the mobile node location according to the reference of the network layer has a problem in that it is more difficult to be realized than the transmission technology on the MAC layer.

DISCLOSURE

Technical Problem

An object of the present invention is to solve the problem of the conventional technology that a location measuring procedure based on a network layer in a Wireless Personal Area Network (WPAN) is complicated and a mobile node location is not measured without a transmission procedure of ranging measurement information since only a data communication procedure is defined through only a Media Access Control (MAC) layer.

An embodiment of the present invention is directed to providing a method for measuring a node location using an MAC layer which can easily measure a mobile node location while maintaining compatibility with a typical MAC layer by measuring the mobile node location using an MAC frame newly defined to be capable of measuring the mobile node location through the MAC layer in a Wireless Personal Area Network.

The objects of the present invention are not limited to the above-mentioned ones. Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In order to solve the problem, the present invention measures a mobile node location using a Media Access Control (MAC) frame newly defined to be capable of measuring the mobile node location through an MAC layer in a Wireless Personal Area Network (WPAN).

In accordance with an aspect of the present invention, there is provided a method for measuring a node location using a Media Access Control (MAC) layer in a coordinator node, including: requesting ranging measurement to the mobile node by broadcasting an MAC frame where ranging measurement start is displayed according to a ranging measurement request message for a mobile node transmitted from outside; and receiving ranging measurement information measured in the mobile node as a response to the broadcasted MAC frame and broadcasting an MAC frame where ranging measurement end is displayed.

The method further includes: transmitting the received ranging measurement information to an external positioning system.

In addition, the method further includes: setting up a data communication zone having the maximum radius required for performing data communication according to a star topology and a ranging measurement zone having a radius required for performing ranging measurement between the mobile node and a reference node.

In accordance with another aspect of the present invention, there is provided a method for measuring a node location using a MAC layer in a mobile node, including: receiving a request for ranging measurement from a coordinator node through a broadcasted MAC frame and displaying on the MAC frame whether the ranging measurement is in progress after receiving the request for the ranging measurement; creating ranging measurement information on a distance with reference nodes based on the MAC frame displaying whether the ranging measurement is in progress; and transmitting the created ranging measurement information to the coordinator node.

The method includes: requesting ranging measurement to the coordinator node by displaying the request for own ranging measurement on a reserved field of the MAC frame; and receiving own location information from the coordinator node after performing said receiving a request for ranging measurement, said creating ranging measurement information on a distance with reference nodes, and said transmitting the created ranging measurement information.

In addition, the method includes: when there is no own address in a node address field of the broadcasted MAC frame, temporarily stopping data transmission; and restarting the temporarily stopped data transmission upon receiving an MAC frame displaying ranging measurement end from the coordinator node.

Advantageous Effects

The present invention can easily measure a mobile node location while maintaining compatibility with a typical Media Access Control (MAC) layer by measuring the mobile node location using an MAC frame newly defined to be capable of measuring the mobile node location through the MAC layer.

That is, the present invention divides a data communication zone and a ranging measurement zone using a coordinator node as a reference and accepts the requirements of the WPAN standard. Also, the present invention defines a procedure measuring a distance and location between nodes by newly defining a protocol required for exchange of ranging measurement information and transmission of location information in a network in a reserved field of the MAC frame and realizes a location recognizable WPAN.

In a wireless sensor network using a WPAN physical layer and an MAC layer for simultaneously performing distance measurement and data communication, the present invention also can easily realize a location recognizable wireless communication device and network by redefining a network constituent element required for distance measurement and related information transmission and a field required on an MAC frame, and defining a method for setting up related control information between a mobile node and reference nodes on a network and a ranging measurement procedure when location detection is requested in a location system or a mobile device.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

To help understanding of the present invention, a mobile node location measuring method using a Wireless Personal Area Network (WPAN) physical layer and a Media Access Control (MAC) layer where distance measurement and data communication are simultaneously performed will be described.

Figure 1:
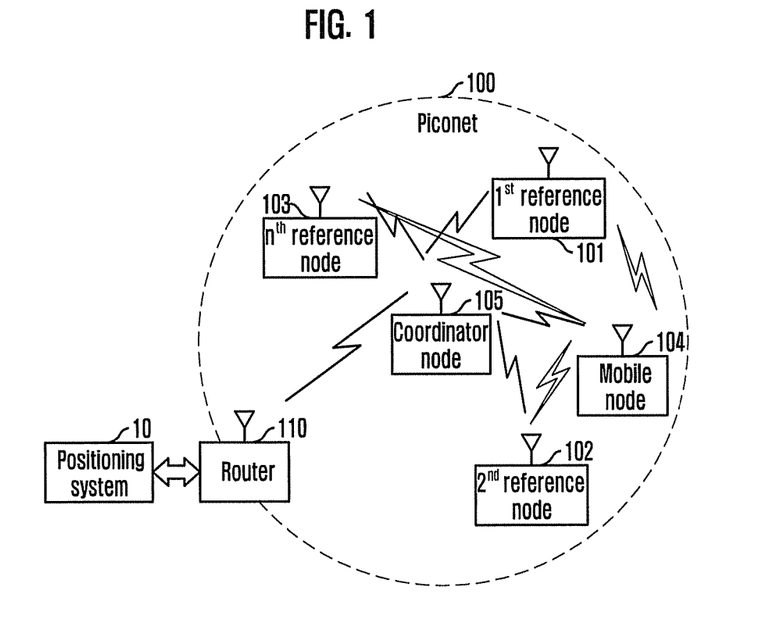
FIG. 1 is a block diagram of a Wireless Personal Area Network (WPAN) where the present invention is applied.

FIG. 1 is a block diagram of a WPAN where the present invention is applied.

As shown in FIG. 1, the WPAN includes a $1^{st}$ reference node 101, a $2^{nd}$ reference node 102, an $n^{th}$ reference node 103, a mobile node 104, a coordinator node 105, and a router 110 within a piconet 100. The router 110 relays the coordinator node 105 within the piconet 100 with an external positioning system 10.

The $1^{st}$ to $n^{th}$ reference nodes 101 to 103, the mobile node 104, and the coordinator node 105 used in the present invention simultaneously perform data communication and distance measurement using a signal generated in one signal generator installed inside the device.

According to levels that an MAC layer function is realized within the piconet 100, nodes included in the WPAN are divided into a full function device (FFD) which is usable as a coordinator and a reduced function device (RFD) which is not used as a coordinator but as a sensor device. A distance measurable device in the FFDs or the RFDs is called Ranging capable DEVice (RDEV).

The $1^{st}$ to $n^{th}$ reference nodes 101 to 103 store own location, i.e., a location coordinates value, in advance through initial location setup, and operate as a reference node for measuring a distance from the mobile node 104 within the piconet 100.

The mobile node (MN) 104 has mobility and measures a distance from the $1^{st}$ to $n^{th}$ reference nodes 101 to 103 within the piconet 100.

The coordinator node 105 has a ranging measurement function and transmits ranging measurement information transmitted from the mobile node 104 to the positioning system 10 through the router 110. The coordinator node 105 performs location operation based on the ranging measurement information transmitted from the mobile node 104. The coordinator node 105 transmits the location information acquired through the location operation to the mobile node 104. It is assumed that the $1^{st}$ to $n^{th}$ reference nodes 101 to 103 and the coordinator node 105 grasp own location coordinates through an initial location measuring procedure.

The router 110 relays the coordinator node 105 of the piconet 100 with the positioning system 10. That is, the router 110 transmits the ranging measurement information transmitted from the coordinator node 105 to the positioning system 10 and the location information transmitted from the positioning system 10 to the coordinator node 105. When the WPAN includes a plurality of piconets, ranging measurement information between a specific coordinator 105 and the positioning system 10 and other information are transmitted through a plurality of routers 110.

Functions of each node for ranging measurement will be described in detail. When the positioning system 10 requests the coordinator node 105 to detect a location of the mobile node 104, or when the mobile node 104 requests the coordinator node 105 to detect own location, if necessary, the coordinator node 105 performs the location measuring procedure in the WPAN.

Subsequently, the mobile node 104 measures distances from more than three reference nodes 101 to 103 to apply triangulation. The mobile node 104 creates ranging measurement information on the distance from the $1^{st}$ reference node 101, the $2^{nd}$ reference node 102, and the $n^{th}$ reference node 103. The mobile node 104 transmits the created ranging measurement information to the coordinator node 105. The ranging measurement information includes information on any one of a distance operation value or a time measurement value. Also, the ranging measurement information includes the mobile node 104, the reference nodes 101 to 103, which are measurement references, and detailed information on the ranging measurement procedure besides a ranging measurement value.

The coordinator node 105 transmits the ranging measurement information to the positioning system 10 through the router 110, or directly performs the location operation. The positioning system 10 entirely performs monitoring on the location operation and the nodes inside the network. When there are a plurality of the piconets 100, a route should be set up in advance to pass through the router 110 over several hops of a sensor network.

Considering in view of the network, when a network between the coordinator node 105 and each neighboring node, i.e., the $1^{st}$ to $n^{th}$ reference nodes, is formed of a star topology, each neighboring node can transmit the ranging measurement information to each other only through the coordinator node 105. Accordingly, a distance can be measured through operation as a partial mesh network among the mobile node 104 and the $1^{st}$ reference node 101, the $2^{nd}$ reference node 102, and the $n^{th}$ reference node 103, which are reference nodes on distance measurement. The ranging measurement zone and the data communication zone for the mesh network will be described with reference to FIG. 2.

Figure 2:
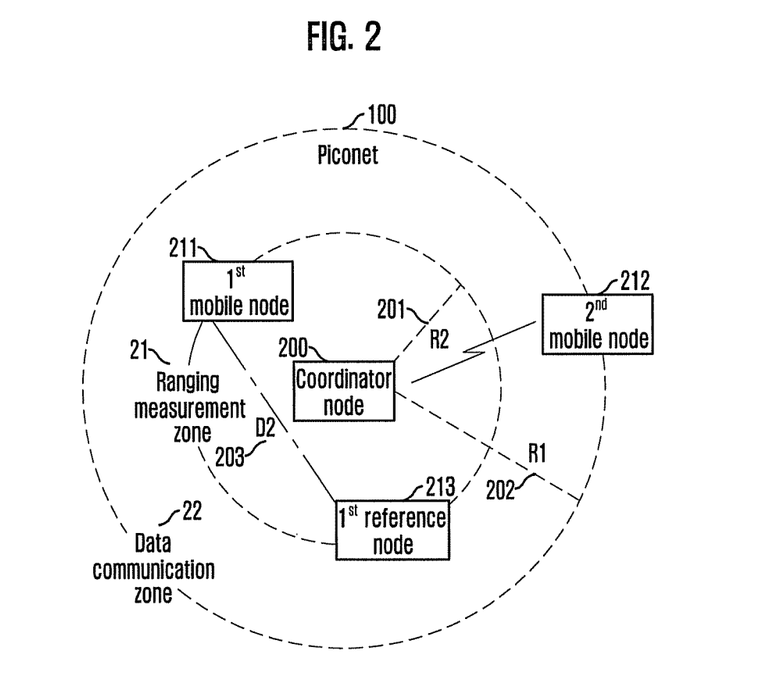
FIG. 2 is a block diagram showing the WPAN where the ranging measurement zone and the data communication zone are displayed.

FIG. 2 is a block diagram showing the WPAN where the ranging measurement zone and the data communication zone are displayed.

Transmission output of the nodes inside one piconet 100 is limited by radio regulation of each nation in air transmission. Accordingly, the maximum transmission distance for packet transmission by the node is determined. According to a radar formula such as Equation 1 showing relation between radio transmission and reception powers, a reception power $P_{rx}$ in one-way air transmission is in proportion to a transmission power $P_{tx}$ and is in inverse proportion to the square of a distance R.

$$P_{rx}(r) \propto \frac{P_{tx}}{R^2} \qquad \text{Eq. 1}$$

where $P_{rx}$ represents reception power in one-way air transmission; $P_{tx}$ represents transmission power; and R represents a distance.

In Equation 1, when any one node of the two same nodes transmits a packet to the other node at the maximum transmission output $P_{tx\_max}$, the maximum transmission radius $R_{max}$ is determined by a signal sensitivity level of a fixed reception node.

As shown in FIG. 2, a maximum transmission distance R1 202 between a coordinator node 200 and a $2^{nd}$ mobile node 212 in the piconet 100 is set up as the maximum transmission radius $R_{max}$ according to a signal sensitivity level of a fixed receiver as shown in Equation 1. Accordingly, when it is assumed that there is the same transmission/reception characteristic, a transmission distance D2 203 between a $1^{st}$ mobile node 211 and a $1^{st}$ reference node 213 should have a value smaller than the maximum transmission radius $R_{max}$.

When a distance between the $1^{st}$ mobile node 211 and the $1^{st}$ reference node 213 is the maximum transmission radius $R_{max}$, and locations of the $1^{st}$ mobile node 211 and the $1^{st}$ reference node 213 are on radius of a symmetric R2 201 having the coordinator node 200 as a center, the $1^{st}$ mobile node 211 and the $1^{st}$ reference node 213 are located in the maximum communicable transmission distance. In this state, when the $1^{st}$ mobile node 211 goes out of the maximum communicable transmission distance on an axis of the transmission distance D2 203, the $1^{st}$ mobile node 211 is still able to communicate with the coordinator node 200 but may not perform communication for ranging measurement with the $1^{st}$ reference node 213.

The coordinator node 200 defines a data communication zone 22 having the maximum transmission radius $R_{max}$ to perform data communication with the 1st mobile node 211, the 2nd mobile node 212 or the 1st reference node 213 on the star topology.

Also, the coordinator node 200 sets up a ranging measurement zone 21 corresponding to a distance smaller than the maximum transmission radius $R_{max}$ to enable ranging measurement according to the defined data communication zone 22. That is, the coordinator node 200 selects the ranging measurement zone 21 smaller than the maximum transmission radius $R_{max}$ or reference nodes for ranging measurement of the 1st mobile node 211 on the mesh network partially formed between the 1st mobile node 211 and the 1st reference node 213, the 1st mobile node 211 and the coordinator node 200, or the 2nd mobile node 212 and the 1st reference node 213.

After the ranging measurement zone 21 is set up, the coordinator node 200 manages the entire network to perform good communication for ranging measurement based on the set up data communication zone 22 and ranging measurement zone 21. The radius R2 201 of the ranging measurement zone 21 has a value smaller than the radius R1 202 of the data communication zone 22. That is, relation as R2 201≦R1 202 is formed.

Figure 3:
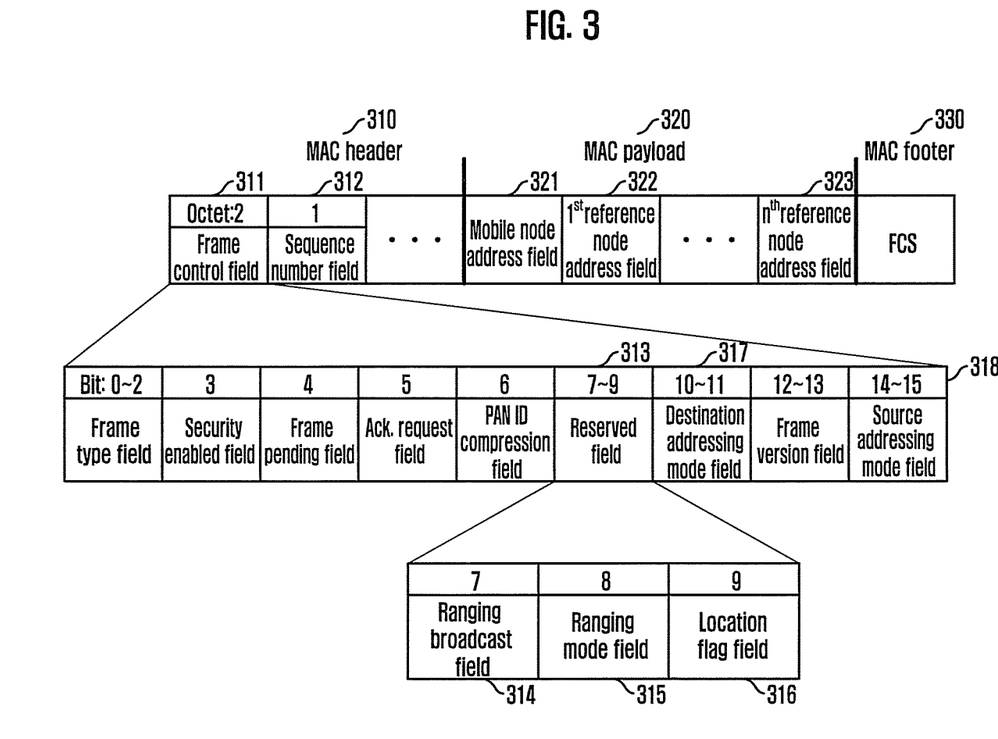
FIG. 3 shows an MAC frame where a reserved field is redefined in accordance with an embodiment of the present invention.

FIG. 3 shows an MAC frame where a reserved field is redefined in accordance with an embodiment of the present invention.

In order to measure locations of each node of the WPAN based on the conventional MAC layer, the present invention should add data communication functions among a plurality of nodes to detect a specific node location besides a ranging measurement procedure between a mobile node and a reference node according to a two way ranging (TWR) method.

Accordingly, the present invention does not designate an individual packet or communication method to a network layer, which is an upper layer of the MAC layer, but uses a reserved field 313 of an MAC frame whose usage is not designated in "Institute of Electrical and Electronics Engineers (IEEE) 802.15.4" standard.

As shown in FIG. 3, the MAC frame except an acknowledgement (Ack) frame includes an MAC header 310, an MAC payload 320, and an MAC footer 330.

The MAC header 310 includes a frame control field 311 and a sequence number field 312. Two initial Octets of the MAC header 310 is the frame control field 311. The frame control field 311 includes a frame type field, a security enabled field, a frame pending field, an Ack. request field, a PAN identification (ID) compression field, a reserved field 313, a destination addressing mode field 317, a frame version field, and a source addressing mode field 318 required for controlling the MAC frame.

In order to apply the two way ranging method without designating an additional frame required for ranging measurement, the present invention defines the reserved fields 313 ranging from 7th bit to 9th bit of the frame control field 311 as a ranging broadcast field 314, a ranging mode field 315, and a location flag field 316 for ranging and ranging measurement.

In the present invention, when the number of reference nodes used for ranging measurement is n, the coordinator node has related nodes to perform a preparing procedure for ranging measurement by loading and transmitting addresses of a mobile node, a 1st reference node, and an nth reference node corresponding to a mobile node address field 321, a 1st reference node address field 322, and an nth reference node address field 323 of the MAC payload 320.

The ranging broadcast field 314 of the MAC frame will be described in detail. For ranging measurement, the ranging broadcast field 314 is defined to a 7th bit of the frame control field 311. When the coordinator node 105 of FIG. 1 starts ranging measurement for detecting a location of the mobile node 104, the coordinator node 105 transmits related information to nodes in the piconet 100. At this time, the coordinator node 105 changes the bit of the ranging broadcast field 314 and notifies to the nodes of the piconet 100 that the ranging measurement is started. That is, the coordinator node 105 performs a function of allowing data transmission of only nodes related to the ranging measurement procedure based on the ranging broadcast field 314 and stopping data transmission of other nodes. The coordinator node 105 also performs a function of allowing data transmission of all nodes when the ranging measurement procedure is disabled.

To be specific, the coordinator node 105 sets up a bit of the ranging broadcast field 314 as "1" and notifies to the nodes of the piconet 100 that the ranging measurement procedure starts. At this time, the coordinator node 105 sets up the destination addressing mode field 317 of the MAC header 310 as "0xffff" and broadcasts an MAC frame to the nodes in the piconet 100.

For example, in case of using a data frame, the coordinator node 105 sets up the destination addressing mode field 317 as "0xffff" such that the nodes of the piconet 100 can receive the data frame. Subsequently, the coordinator node 105 notifies that the nodes are used in the ranging measurement procedure by respectively loading and transmitting address information of the node in the mobile node address field 321 and the 1st to nth reference node address fields 322 and 323 of the MAC payload 320. Other nodes stop data transmission/reception until the ranging measurement procedure is disabled and stays in a waiting state. When the ranging measurement procedure is disabled, the coordinator node 105 sets up the field of the ranging broadcast field 314 as "0" to notify the end of the ranging measurement to the nodes of the piconet 100, and transmits the data frame to the nodes.

The ranging mode field 315 is defined at the 8th bit of the reserved field 313 for ranging measurement. The ranging mode field 315 divides whether the ranging measurement mode is for positioning or tracking. The ranging mode field 315 designates information on which device of the mobile node 104 and the positioning system 10 requires ranging measurement. That is, the mobile node 104 requests positioning to the coordinator node 105 and the positioning system 10 requests tracking of the mobile node to the coordinator node 105.

For example, the positioning system 10 sets up the ranging mode field 315 as "1" for initial tracking of the mobile node 104, and requests positioning to the coordinator node 105. The coordinator node 105 transmits ranging measurement information transmitted from the mobile node 104 to the positioning system 10. On the other hand, the mobile node 104 sets up the ranging mode field 315 as "0" for initial ranging measurement, and requests positioning to the coordinator node 105. Subsequently, the coordinator node 105 transmits the ranging measurement information transmitted from the mobile node 104 to the positioning system 10 and transmits location information operated in the positioning system 10 to the mobile node 104.

The location flag field 316 is defined at a 9th bit of the reserved field 313 for ranging measurement. The location flag field 316 displays that a ranging measurement procedure between the mobile node 104 and the 1st to nth reference nodes 101 to 103 is in progress in the piconet 100. The location flag field 316 is different from a ranging (RNG) field of a physical layer header of "IEEE802.15.4a" standard. The RNG field displays that a transmitted/received frame is a Ranging FRAME (RFRAME) used in point-to-point ranging measurement between two nodes and has a counter for ranging measurement to operate by setting up a value through the initializing and ending procedure.

However, the location flag field 316 notifies whether the ranging measurement procedure is in progress or not. For ranging measurement of the mobile node 104, the coordinator node 105 broadcasts a frame notifying start of an initial ranging measurement procedure based on the ranging broadcast field 314. Subsequently, the nodes related to the ranging measurement, i.e., the mobile node 104 and the $1^{st}$ to $n^{th}$ reference nodes 101 to 103, activate the location flag field 316 as "1" and transmit a frame. When the ranging measurement procedure is disabled, the mobile node 104 and the $1^{st}$ to $n^{th}$ reference nodes 101 to 103 transmit a frame initializing the bit of the location flag field 316 as "0" to the coordinator node 105. In order to notify to the nodes on the piconet 100 that the ranging measurement procedure is disabled, the coordinator node 105 transmits an MAC frame and allows data transmission of the nodes.

Figure 4:
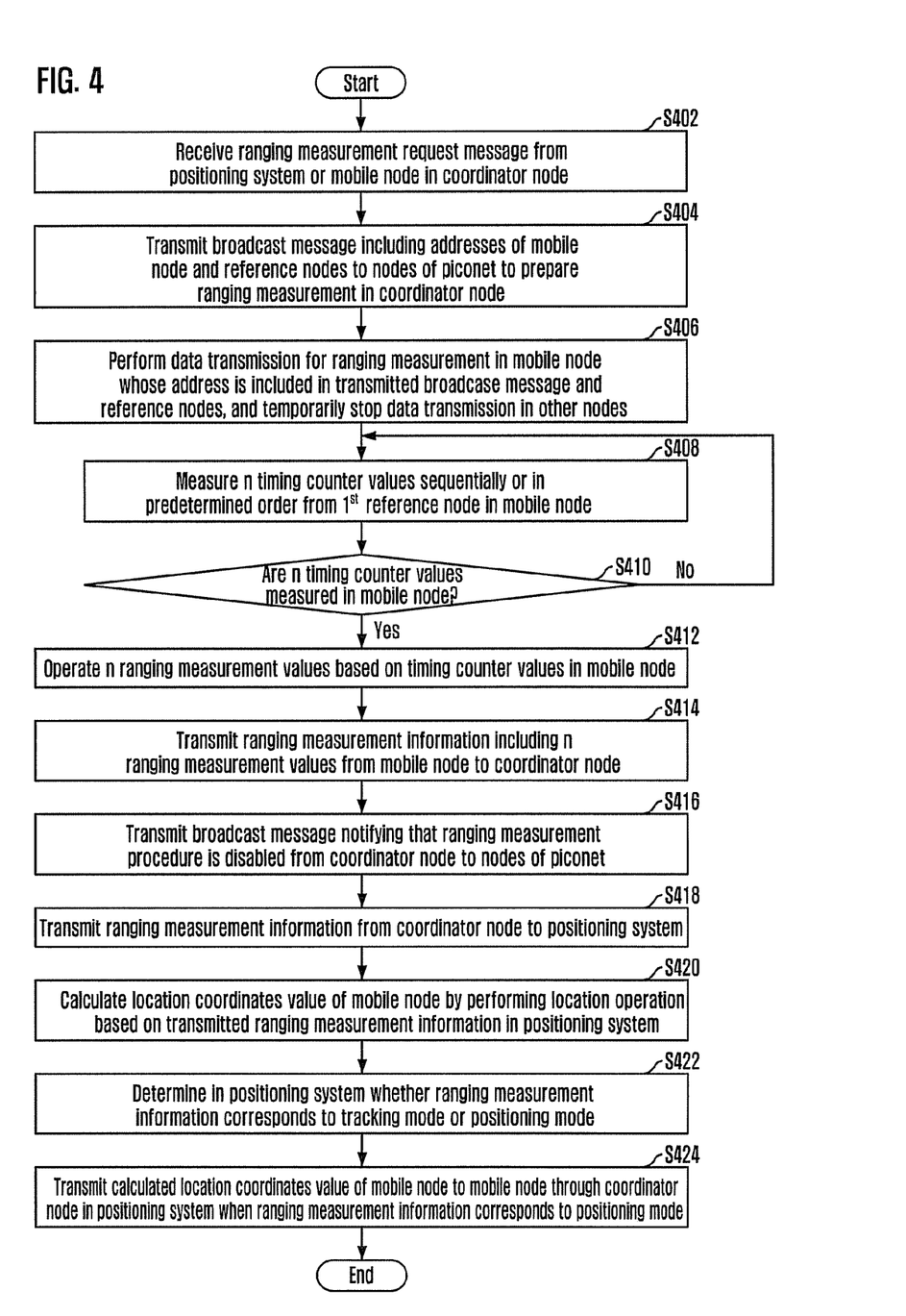
FIG. 4 is a flowchart describing a node positioning method using an MAC layer of the WPAN in accordance with an embodiment of the present invention.

FIG. 4 is a flowchart describing a node positioning method using an MAC layer of the WPAN in accordance with an embodiment of the present invention.

As shown in FIG. 1, the coordinator node 105 is connected to the positioning system 10 through the router 110 and transmits ranging measurement information transmitted from the mobile node 104 to the positioning system 10. It is assumed that the mobile node 104 forms the piconet 100 where a ranging measurement zone and a data communication zone capable of communicating with at least three reference nodes having the coordinator node 105 as a center are displayed. It is defined that the number of reference nodes used according to an algorithm for positioning is n. When the number n of reference nodes is larger than 3, triangulation can be applied and the coordinator node 105 can be included in the reference node.

To have a look at the node positioning method in accordance with the present invention, the coordinator node 105 receives a ranging measurement request message for tracking from the positioning system 10 or a ranging measurement request message for positioning from the mobile node 104 at step S402. The coordinator node 105 performs a ranging measurement procedure upon receiving the ranging measurement request message, checks a bit value of the ranging mode field 315 and determines whether the ranging measurement request message is the ranging measurement request message for tracking transmitted from the positioning system 10 or the ranging measurement request message for positioning transmitted from the mobile node 104. A determination result of the ranging measurement mode is included in the ranging measurement information in a following procedure and transmitted to the positioning system 10.

The coordinator node 105 transmits an MAC frame including addresses of the mobile node 104 and the $1^{st}$ to $n^{th}$ reference nodes 101 to 103, i.e., a broadcast message, to the nodes of the piconet 100 to prepare ranging measurement at step S404. That is, the coordinator node 105 transmits the MAC frame where ranging measurement start is displayed on the ranging broadcast field 314 to the mobile node 104 and requests ranging measurement. The coordinator node 105 loads the addresses of the mobile node 104 related to ranging measurement and the n reference nodes in the mobile node address field 321 and the $1^{st}$ to $n^{th}$ reference node address fields 322 and 323 of the MAC payload 320 inside the MAC frame and transmits the addresses to the nodes.

The nodes of the piconet 100 receiving an MAC frame broadcast message checks whether own address is included.

When own address is included, the mobile node 104 and the $1^{st}$ to $n^{th}$ reference nodes 101 to 103 perform data transmission for ranging measurement and other nodes temporarily stop data transmission at step S406 until the ranging measurement procedure is disabled. Subsequently, the mobile node 104 and the $1^{st}$ to $n^{th}$ reference nodes 101 to 103 set up the location flag field 316 of the messages to be transmitted as "1" and notify to the nodes of the piconet 100 that the ranging measurement procedure is in progress.

When the ranging measurement on each node of the piconet 100 is prepared at the step S406, the mobile node 104 performs ranging measurement with the $1^{st}$ to $n^{th}$ reference nodes 101 to 103. That is, the mobile node 104 measures n timing counter values with respect to each reference node ranging from the $1^{st}$ reference node 101 to the $n^{th}$ reference node 103 sequentially or in a predetermined order at step S408. For example, the mobile node 104 measures a timing counter value corresponding to a packet round-trip time according to a Symmetric Double Sided-Two Way Ranging (SDS-TWR) method.

The mobile node 104 checks through the $1^{st}$ to $n^{th}$ reference nodes 101 to 103 at step S410 whether n timing counter values are measured.

When the n timing counter values are completely measured at the check result of the step S410, the mobile node 104 operates a ranging measurement value for the $1^{st}$ to $n^{th}$ reference nodes 101 to 103 based on the n timing counter values measured in the n reference node at step S412. When the n timing counter values are not acquired, a logic flow goes to the step S408.

The mobile node 104 transmits ranging measurement information including the operated n ranging measurement values to the coordinator node 105 at step S414. At this time, the mobile node 104 displays on the location flag field 316 that the ranging measurement procedure with the reference node is disabled, and transmits the ranging measurement information to the coordinator node 105.

The coordinator node 105 checks the ranging measurement information transmitted from the mobile node 104 and the location flag field 316, and transmits an MAC frame in a format of a broadcast message that the ranging measurement procedure is disabled to the nodes of the piconet 100 at step S416. That is, the coordinator node 105 allows data transmission of the nodes of the piconet 100 by transmitting the MAC frame. At this time, the coordinator node 105 sets up the ranging broadcast field 314 of the frame to be transmitted and displays that the ranging measurement procedure is disabled.

The coordinator node 105 transmits the ranging measurement information to the positioning system 10 outside the piconet 100 through the router 110 at step S418. The ranging measurement information includes n ranging measurement values for the mobile node 104 and a ranging measurement mode determination result.

The positioning system 10 checks a location of the mobile node 104 at step S420 by applying the ranging measurement information transmitted from the coordinator node 105 to a location operation algorithm. That is, the positioning system 10 calculates a location coordinates value corresponding to the location of the mobile node 104.

The positioning system 10 determines at step S422 based on the mode determination result included in the ranging measurement information whether the ranging measurement information corresponds to a tracking mode or a positioning mode.

When the ranging measurement information corresponds to the location tracking mode, the positioning system 10 stores the calculated location coordinates value and disables the ranging measurement procedure. When the ranging measurement information corresponds to the positioning mode, the positioning system 10 transmits the calculated location coordinates value of the mobile node 104 to the mobile node 104 through the router 110 and the coordinator node 105 at step S424.

Figure 5:
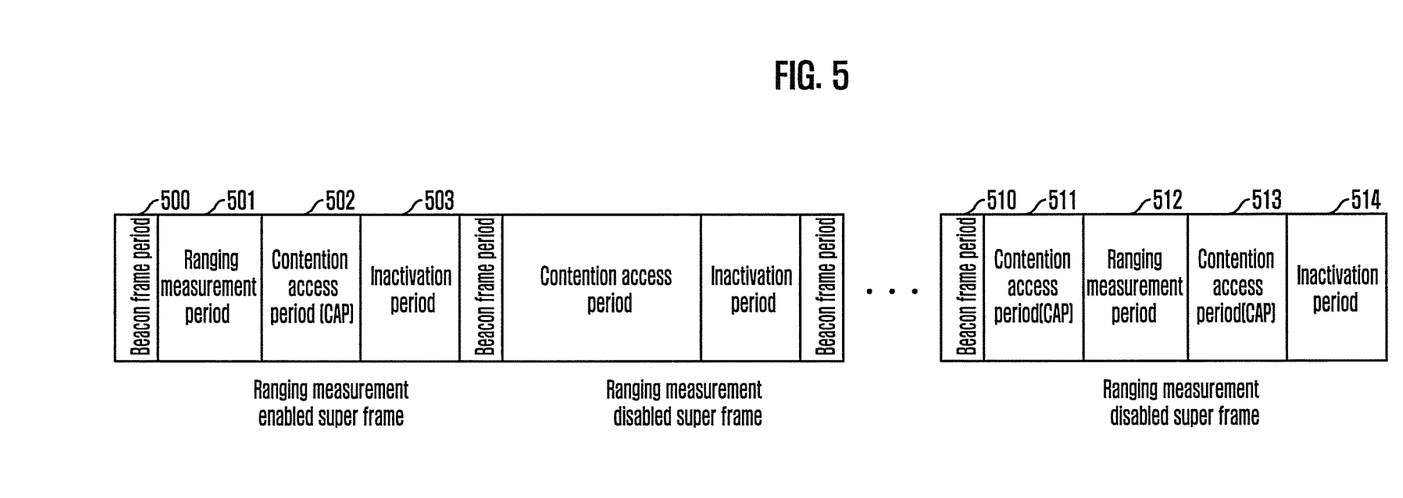
FIG. 5 shows a super frame where a ranging measurement period is applied in accordance with an embodiment of the present invention.

FIG. 5 shows a super frame where a ranging measurement period is applied in accordance with an embodiment of the present invention.

As shown in FIG. 5, a super frame in the WPAN includes beacon frame periods 500 and 510, contention access periods (CAP) 502, 511 and 513, and inactivation periods 503 and 514.

To have a look at a timing diagram showing the super frame transmitted in the WPAN of FIG. 5, the ranging measurement period in accordance with the present invention may be applied after the beacon frame period 500 or the contention access period 511 in the entire super frame period. That is, the ranging measurement period is applied between the beacon frame period 500 and the contention access period 502, or within the contention access periods 511 and 513.

The coordinator node 105 sets up a ranging measurement period 501 after the beacon frame period 500 periodically transmitted in the WPAN. The mobile node 104 performs a positioning procedure between the beacon frame period 500 and the contention access period 502 by loading and transmitting the ranging measurement information in the ranging measurement period 501.

On the other hand, the coordinator node 105 sets up the ranging measurement period 512 in the middle of performance of the contention access periods 511 and 513 individually from the beacon frame period 510. The mobile node 104 performs the positioning procedure between the contention access periods 511 and 513 by loading and transmitting the ranging measurement information in a comment frame or a data frame, if necessary, and performs again the positioning procedure on the contention access period 513.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

The present application contains subject matter related to Korean Patent Application Nos. 2007-0099983 and 2008-0048836, filed in the Korean Intellectual Property Office on Oct. 4, 2007 and May 26, 2008, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for measuring a node location using a Media Access Control (MAC) layer in a coordinator node, comprising:
   requesting ranging measurement to a mobile node by broadcasting an MAC frame where ranging measurement start timing is indicated within the broadcasting MAC frame according to a ranging measurement request message for the mobile node transmitted from outside a piconet; and
   receiving ranging measurement information measured in the mobile node as a response to the broadcasted MAC frame and broadcasting the MAC frame where ranging measurement end timing is indicated within the broadcasting MAC frame;
   setting up a data communication zone having the maximum radius required for performing data communication according to a star topology and a ranging measurement zone having a radius required for performing ranging measurement between the mobile node and a reference node.

2. The method of claim 1, further comprising: transmitting the received ranging measurement information to an external positioning system.

3. The method of claim 1, wherein the ranging measurement zone is partially formed of a mesh network on Wireless Personal Area Network (WPAN).

4. The method of claim 1, wherein it is determined by checking a reserved field of the received ranging measurement request message whether the request is from the positioning system or the mobile node.

5. The method of claim 4, further comprising: when the received ranging measurement request message is the ranging measurement request message requested by the mobile node, receiving location information of the mobile node operated in the external positioning system and transmitting the location information of the mobile node to the mobile node.

6. The method of claim 1, wherein the ranging measurement start is displayed by changing a bit of the ranging broadcast field in the reserved field of the MAC frame.

7. The method of claim 6, wherein the ranging measurement end is displayed by changing the bit of the ranging broadcast field in the reserved field of the MAC frame.

8. The method of claim 7, wherein the MAC frame includes addresses of a mobile node related to the ranging measurement and reference nodes.

9. The method of claim 7, wherein ranging measurement is performed between a beacon frame period and a contention access period (CAP) within a super frame according to the node ranging measurement method.

10. The method of claim 7, wherein the node ranging measurement method is performed in the contention access period within the super frame.

* * * * *